(12) United States Patent
Yun et al.

(10) Patent No.: US 10,079,399 B2
(45) Date of Patent: Sep. 18, 2018

(54) FUEL, CELL, AND GENERATION SYSTEM AND METHOD USING THE SAME

(71) Applicant: DOOSAN HEAVY INDUSTRIES & CONSTRUCTION CO., LTD., Changwon-si (KR)

(72) Inventors: Choa Mun Yun, Daejeon (KR); Sung Hoon Kim, Anyang-si (KR); Won Joon Choi, Daejeon (KR); In Gab Chang, Daejeon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 889 days.

(21) Appl. No.: 14/337,386

(22) Filed: Jul. 22, 2014

(65) Prior Publication Data
US 2015/0030944 A1  Jan. 29, 2015

(30) Foreign Application Priority Data
Jul. 23, 2013 (KR) ........................ 10-2013-0086955

(51) Int. Cl.
| | | |
|---|---|---|
| H01M 8/16 | (2006.01) | |
| H01M 8/0662 | (2016.01) | |
| H01M 8/0612 | (2016.01) | |
| C02F 11/04 | (2006.01) | |
| H01M 8/14 | (2006.01) | |
| B01D 53/22 | (2006.01) | |

(52) U.S. Cl.
CPC ....... *H01M 8/0662* (2013.01); *H01M 8/0612* (2013.01); *H01M 8/0618* (2013.01); *H01M 8/0675* (2013.01); *H01M 8/0687* (2013.01); *B01D 53/22* (2013.01); *B01D 2256/245* (2013.01); *B01D 2257/504* (2013.01); *B01D 2258/05* (2013.01); *C02F 11/04* (2013.01); *H01M 2008/147* (2013.01); *Y02E 50/343* (2013.01); *Y02E 60/526* (2013.01); *Y02W 10/23* (2015.05)

(58) Field of Classification Search
CPC ...................................................... H01M 8/16
See application file for complete search history.

(56) References Cited

U.S. PATENT DOCUMENTS

| | | | |
|---|---|---|---|
| 4,921,765 A | | 5/1990 | Gmeindl et al. |
| 2008/0152967 A1* | | 6/2008 | Roychowdhury ...... C02F 11/04 429/422 |

FOREIGN PATENT DOCUMENTS

| | | | |
|---|---|---|---|
| JP | 9097622 A | | 4/1997 |
| JP | 2000-167523 | * | 6/2000 |
| JP | 2002275482 A | | 9/2002 |
| JP | 2006127917 A | | 5/2006 |
| KR | 1020090067427 A | | 3/2010 |
| KR | 1020120014840 A | | 9/2013 |

* cited by examiner

Primary Examiner — Jacob Marks
(74) Attorney, Agent, or Firm — Sughrue Mion, PLLC

(57) ABSTRACT

A fuel cell using biogas as a fuel is provided, in which the fuel cell is supplied with a first gas required at a fuel electrode and a second gas required at an air electrode, which are separated from the biogas by a selective permeation method using a separation membrane of a gas-purification separation unit, and supplies gas discharged from the fuel cell along with the biogas to the gas-purification separation unit.

16 Claims, 5 Drawing Sheets

FUEL, CELL, AND GENERATION SYSTEM AND METHOD USING THE SAME

CROSS-REFERENCE TO RELATED APPLICATION

Pursuant to 35 U.S.C. § 119(a), this application claims the benefit of earlier filing date and right of priority to Korean Application No. 10-2013-0086955, filed on Jul. 23, 2013, the contents of which is incorporated by reference herein in its entirety.

BACKGROUND OF THE DISCLOSURE

1. Field of the Disclosure

The present disclosure relates to a fuel cell and a generation system and method using the same, and particularly, to a fuel cell using biogas as a fuel, and a generation system and method using the same.

2. Background of the Disclosure

A fuel cell is an apparatus which electrochemically reacts fuel with an oxidant to generate electrical energy. Unlike general cells, the fuel cell consumes fuel to generate power.

Examples of the fuel cell include various kinds of fuel cells such as a molten carbonate fuel cell (MCFC), a polymer electrolyte membrane fuel cell (PEMFC), a solid oxide fuel cell (SOFC), a direct methanol fuel cell (DMFC), a direct ethanol fuel cell (DEFC), and a phosphoric acid fuel cell (PAFC).

Among the fuel cells, the MCFC is a fuel cell which is the most commercialized. In this specification below, the MCFC will be described unless otherwise specifically mentioned, but it is not intended that the scope of the present invention are limited thereto.

To provide a detailed description on the MCFC, the MCFC is a fuel cell that uses hydrocarbon as a fuel. Generally, the MCFC includes a fuel electrode (anode), an air electrode (cathode), and a matrix, and an electrolyte is impregnated in each of the elements. A hydrogen fuel gas generated through a reforming reaction of natural gas is injected into the fuel electrode of the MCFC, and carbon dioxide and oxygen are supplied to the air electrode, whereby a carbonate ion ($CO_3^{2-}$) is generated in the air electrode. The carbonate ion generated in the air electrode moves from the air electrode to the fuel electrode through the electrolyte of the matrix which is disposed between the fuel electrode and the air electrode, and an electron generated in the fuel electrode passes through an external circuit. In this case, the electrolyte is normally in a solid state, and when the fuel cell is steadily operated, the temperature rises to about 650° C. to liquefy the electrolyte.

Generally, when fuel cells having a high operating temperature like the MCFC, a perovskite catalyst and a noble metal catalyst such as Pd and Pt, which show a high combustion reaction activity are used. This refers to a catalytic combustion, and is a method of performing flameless combustion on the surface of a solid catalyst by the oxidation-promotion action of the catalyst by supplying a mixed gas of a fuel and air to a combustion apparatus including the solid catalyst therein. The catalytic combustion has been used in the wide fields for the purpose of completely oxidizing fuel or hazardous substances into oxygen to obtain energy or make them harmless, but there is a problem in that the service life thereof is reduced by effects caused by catalyst poisoning when sulfur (S) is supplied.

Meanwhile, as the fuel supplied to the fuel cell, natural gas is mostly used, but in an effort to diversify fuel sources, fuel cells, which use biogas including anaerobic digestion gas (ADG) which includes, as a main component, methane ($CH_4$) generated as food waste, livestock manure, and sludge from sewage treatment plants are digested in a digestion tank, or landfill gas generated from waste landfill sites as a renewable gas in addition to natural gas, have also emerged.

Hereinafter, fuel cells which use anaerobic digestion gas as a renewable gas will be described in the present specification, but it is not intended that the scope of the present invention is limited thereto, and it is needless to say the present invention may also be applied to a fuel cell which uses various biogases.

The anaerobic digestion is a traditional technology which has been established and developed for a long period of time, and has been used in treatment of liquid and semi-solid waste in regions where the climate is relatively mild. The anaerobic digestion has been applied to waste having a solid content of 10% or less in most of the process, and has also been tried to be applied to solid waste having a solid content of about 25% by recent development in technology. The anaerobic digestion is also referred to as methane fermentation, and has been applied for the main purpose of treating wastewater or waste and simultaneously collecting energy which is methane. The methane fermentation has not been actively used since the spread of the activated sludge method, but has been used as an energy means for actively replacing petroleum for the purpose of collecting energy from large amounts of organic waste in the urban garbage as well as manure and sewage due to the advantage in that collected gas ($CH_4$: 50 to 70%, $CO_2$: 30 to 50%) has enabled to be used as a fuel since the oil shock in the mid-1970s, and the power consumption is low. In this regard, most of the sludge treatment systems from sewage treatment plants in Korea are composed of an enrichment tank→a digestion tank→sludge→a dewatering apparatus to install the digestion tank, and the aforementioned anaerobic digestion reaction occurs in the sewage sludge to be introduced into the digestion tank to produce ADG which includes methane as a main component.

ADG includes impurities such as sulfur components such as hydrogen sulfide ($H_2S$), carbonyl oxysulfide (COS), and methyl mercaptan ($CH_3SH$) and siloxane, and a gas purification process for removing impurities contained in the gas is required for the ADG to be used as a fuel for a fuel cell. The gas purification process as described above is composed of a desulfurization process for removing $H_2S$ and a siloxane removal process, and the ADG is subjected to the ADG gas purification process, and then is supplied as a fuel for a fuel cell.

Even though the ADG purified by being subjected to the gas purification process in the related art is supplied as a fuel for a fuel cell, hydrogen sulfide components are contained in an amount of 5 ppm in the ADG, and thus affect a decrease in voltage of the cell and causes deterioration in performance of the cell due to poisoning effects of a fuel cell reforming catalyst (electrolyte). Furthermore, when a room-temperature desulfurization process is additionally applied in order to maintain the concentrations of the sulfur components within a permissible concentration (0.17 ppm or les), there is a problem in that the economic efficiency is decreased due to costs of a desulfurization apparatus and costs of replenishing a desulfurizing agent.

Further, since methane components and carbon dioxide components are included at a level of 50 to 70% and 30 to 50%, respectively in the ADG, there is a problem in that the voltage of a fuel cell drops due to an increase in partial pressure by carbon dioxide when the carbon dioxide components are supplied to the fuel electrode of the fuel cell.

Therefore, there is a desperate need for a technology required for solving the problem when biogas is used as a fuel for a fuel cell.

SUMMARY OF THE DISCLOSURE

Therefore, an aspect of the detailed description is to provide a fuel cell in which the efficiency, safety and the like thereof are enhanced when biogas is used as a fuel for the fuel cell, and a generation system and method using the same.

To achieve these and other advantages and in accordance with the purpose of this specification, as embodied and broadly described herein, a fuel cell using biogas as a fuel is provided, in which the fuel cell is supplied with a first gas required at a fuel electrode and a second gas required at an air electrode, which are separated from the biogas by a gas-purification separation unit, and supplies gas discharged from the fuel cell along with the biogas to the gas-purification separation unit. In this case, the fuel cell may be supplied with the first gas and the second gas, into which the biogas is separated by means of a selective permeation method using a separation membrane by the gas-purification separation unit, the first gas may include methane, and the second gas may include carbon dioxide.

Preferably, the fuel cell may supply gas discharged from the fuel electrode along with the biogas to the gas-purification separation unit.

In addition, the fuel cell may supply gas discharged from the air electrode to a polisher such that the gas is subjected to hydrogenation reaction with the biogas in order to increase the purity of methane in the biogas. Preferably, the fuel cell may be re-supplied with unreacted hydrogen gas from the polisher.

Furthermore, when the biogas is an anaerobic digestion gas, the fuel cell may preferably provide gas at a high temperature, which is discharged from the fuel cell when sludge is dried and/or digested.

Meanwhile, the present invention provides a fuel cell using biogas as a fuel, in which a hydrogenation reaction with the biogas is used to supply gas discharged from the fuel cell to a polisher which increases the purity of methane in the biogas.

Preferably, the fuel cell may be re-supplied with gas which is supplied to the polisher and is not reacted after a desulfurization reaction.

Further, when the biogas is an anaerobic digestion gas, the fuel cell may provide gas discharged at a high temperature when sludge is dried and/or digested.

Meanwhile, the present invention provides a generation system which uses a fuel cell, including a fuel cell using biogas as a fuel and a gas-purification separation unit which separates a first gas required at a fuel electrode of the fuel cell and a second gas required at an air electrode of the fuel cell from the biogas, in which the fuel cell supplies gas exhausted along with the biogas to the gas-purification separation unit. In this case, the gas-purification separation unit may separate gas externally supplied into a first gas including methane and a second gas including carbon dioxide. In this case, the gas-purification separation unit may separate the biogas into the first gas and the second gas by a selective permeation method using a separation membrane.

According to an exemplary embodiment, a pre-reforming unit which converts hydrocarbon into hydrogen at a front end of the fuel cell, and a mixing unit which mixes the first gas with natural gas at a front end of the pre-reforming unit to supply the mixture to the pre-reforming unit may be further included.

According to another exemplary embodiment, a polisher which subjects gas discharged from an air electrode of the fuel cell to hydrogenation reaction with the biogas to increase the purity of methane in the first gas may be further included. In this case, the polisher may remove sulfur compounds and/or chlorine compounds from a gas in which the hydrogenation reaction is performed.

Preferably, the polisher may re-supply unreacted hydrogen gas to the fuel electrode.

Meanwhile, the present invention provides a generation method using a fuel cell, the method including: separating a first gas required at a fuel electrode of a fuel cell and a second gas required at an air electrode of the fuel cell from biogas by a gas-purification separation unit; supplying the first gas and the second gas to the fuel cell; using the first gas and the second gas to generate power by the fuel cell; and supplying gas discharged to the gas-purification separation unit by the fuel cell.

In addition, the present invention provides a generation method using a fuel cell, the method including: separating a first gas required at a fuel electrode of a fuel cell and a second gas required at an air electrode of the fuel cell from biogas by a gas-purification separation unit; supplying the first gas and the second gas to the fuel cell, using the first gas and the second gas to generate power by the fuel cell, supplying gas discharged from the air electrode of the fuel cell to a polisher; using gas discharged from the air electrode to perform hydrogenation reaction with the biogas by the polisher; and removing sulfur compounds and/or chlorine compounds from a gas in which the hydrogenation reaction is performed by the polisher. Preferably, the method may further include re-supplying unreacted hydrogen gas to the fuel electrode by the polisher.

In this case, in the generation system which uses a fuel cell according to the present invention, the separating of the first gas and the second gas may separate the first gas and the second gas by a selective permeation method using a separation membrane by the gas-purification separation unit.

Furthermore, when the biogas is an anaerobic digestion gas, the fuel cell may further include providing gas discharged at a high temperature when sludge is dried and/or digested.

In the fuel cell, and the generation system and method using the same according to the present invention, a fuel cell to which high-purity methane is supplied from a fuel electrode may enhance in-stack thermal fluid stability by supplying high-purity methane and carbon dioxide through a gas-purification separation unit and/or a polisher to the fuel cell, and the fuel cell to which high-purity carbon dioxide is supplied from an air electrode has a voltage enhancement effect of the cell due to an increase in the partial pressure of carbon dioxide.

Furthermore, the service life of a fuel cell may be enhanced by subjecting a fuel gas to hydrodesulfurization and/or hydrodechlorination reaction utilizing hydrogen gas discharged from the fuel electrode of the fuel cell to remove sulfur and/or chlorine compounds.

Along with this, there is an effect in that the use efficiency of gas used in the fuel cell may be enhanced by re-supplying gas discharged from the fuel electrode of the fuel cell to a gas-purification separation unit and/or a polisher, or re-supplying unreacted gas to the fuel cell by the polisher in which the hydrodesulfurization and/or hydrodechlorination reaction is performed.

Further, surplus heat of the fuel cell may be prevented from being lost by using gas at a high temperature, which is discharged from the fuel cell as a heat source when natural gas and/or water is heated, or supplying heat energy to a sludge drying machine and/or an anaerobic digestion unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Figure 1:
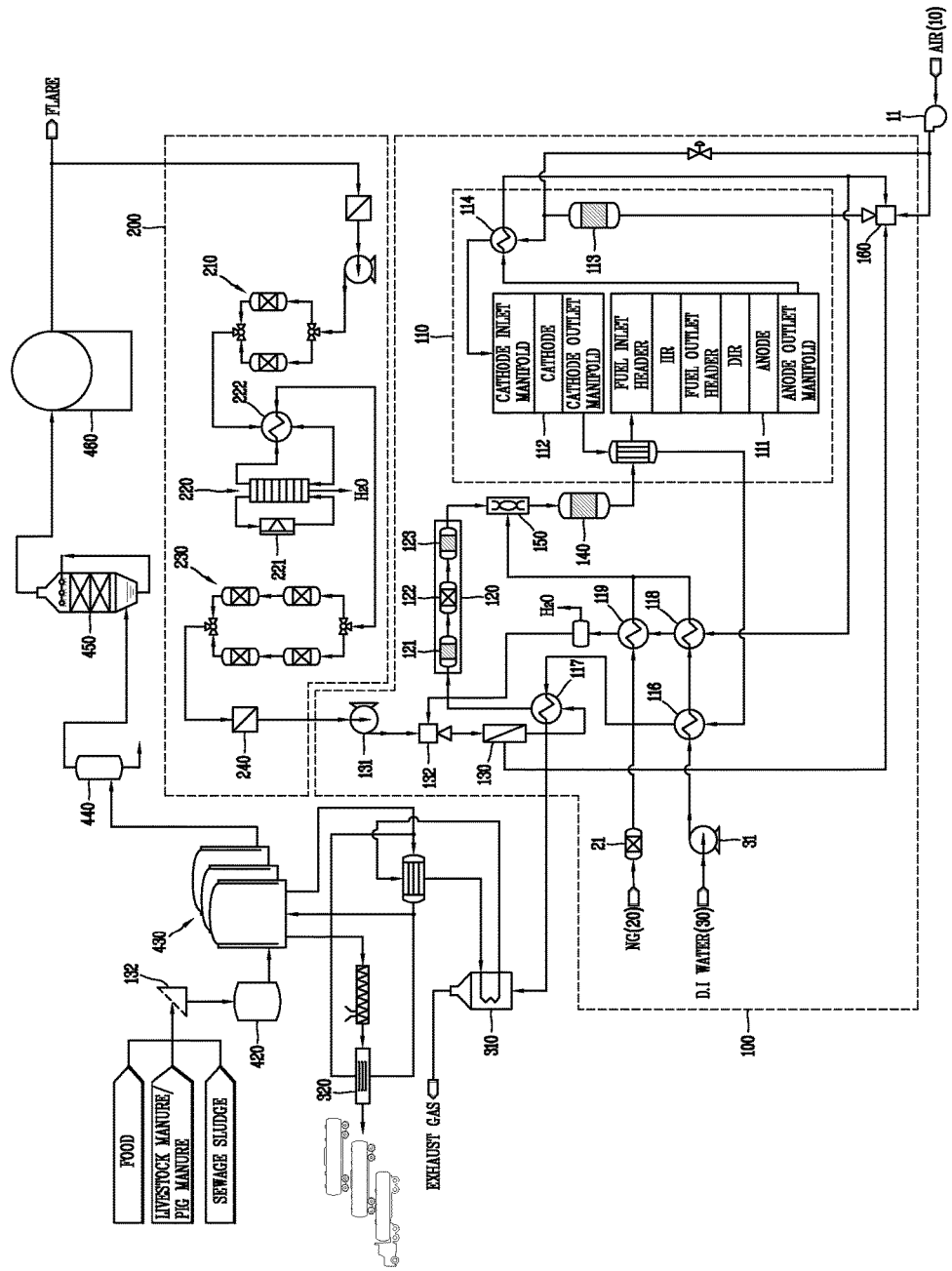
FIG. 1 is a view illustrating a configuration of a fuel cell and a generation system using the same according to an exemplary embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, exemplary embodiments of the present invention will be described in detail with reference to the accompanying drawings so that they can be easily practiced by those skilled in the art to which the present invention pertains. However, the present invention can be modified in various different forms, and is not limited to the exemplary embodiments described herein. In the accompanying portions unrelated to the description will be omitted in order to obviously describe the present invention, and similar reference numerals will be used to describe similar portions throughout the specification.

Hereinafter, specific technical contents to be implemented in the present invention will be described clearly and in detail with reference with the accompanying drawings.

First Exemplary Embodiment

FIG. 1 is a view illustrating a configuration of a fuel cell and a generation system using the same according to an exemplary embodiment of the present invention.

The generation system according to the present invention includes a fuel cell 110 which uses biogas, as a fuel, including anaerobic digestion gas generated as food, livestock manure/pig manure, sewage sludge and the like are digested in a digestion tank, or landfill gas generated from waste landfill sites, fuel cells which use anaerobic digestion gas as a renewable gas will be described in the present specification, but it is not intended that the scope of the present invention is limited thereto, and it is needless to say the present invention may also be applied to a fuel cell which uses various biogases.

As illustrated in FIG. 1, the sequential process of treating biogas until supplied to the fuel cell 110 may be largely divided into a first part in which organic waste such as food, livestock manure/pig manure, and sewage sludge is produced as anaerobic digestion gas (ADG) and stored, or landfill gas is produced and stored, a second part in which pre-treatment is performed in order to remove impurities from the biogas, and a third part in which high-purity fuel is purified from the pre-treated gas.

Accordingly, in-stack thermal fluid stability may be enhanced by providing a fuel electrode of the fuel cell with high-purity methane, and it is possible to bring about an effect of increasing the voltage of the cell by providing an air electrode thereof with high-purity carbon dioxide.

Hereinafter, each part will be divided and described.

The first part is a part in which biogas is produced and stored, and when the biogas is anaerobic digestion gas, solid materials are removed from organic waste such as fishery product processed residue, food waste, sewage sludge, toilet septic tank excrement, and livestock manure through a screen 410 and the like, and solid-liquid separation is performed by using coagulant chemicals and the like. The solid materials thus sorted may be dried through a sludge dryer 320 to become a resource such as carbide or compost, or the leachate may be stored in a leachate storage unit 420 and be utilized as an energy source.

An anaerobic digesting unit 430 decomposes organic material in the sludge into stable organic material or inert inorganic material by action of microbes on the sludge in a sealed tank. The digestion process of the anaerobic digesting unit 430 is a process in which the leachate is decomposed through methane fermentation, acid fermentation and the like by action of anaerobic bacteria in an anaerobic state, and a mixed gas including methane may be produced through the digestion process. The anaerobic bacteria use oxygen in inorganic material and oxygen in compounds such as nitrites, nitrates, and sulfates in water to decompose organic material, and generate methane, hydrogen sulfide, carbonic acid gas, and the like.

The digestion temperature of the anaerobic digesting unit 430 in which the sludge is digested may be classified into high-temperature digestion and medium-temperature digestion at a boundary of about 40° C., and a medium-temperature digestion method in which the digestion process is performed at a digestion temperature of 35° C. is generally adopted.

The mixed gas produced by decomposing organic material by the anaerobic digesting unit 430 includes moisture and separated into mixed gases in gas and liquid states, and the separated mixed gas in a gas state with sulfur compounds removed therefrom may be stored in a biogas storing unit 460.

Herein, dry, wet or biological methods and the like may be applied as a means for removing sulfur compounds before the mixed gas is stored in the biogas storing unit 460, but the efficiency of removing hydrogen sulfide may be increased by bringing the biogas in contact with a sodium carbonate ($Na_2CO_3$) or sodium hydroxide (NaOH) solution to remove the sulfur compounds through a wet desulfurization unit 450.

The second part 200 is a part in which pre-treatment is performed in order to remove impurities from the biogas, and will be described in detail with reference to FIG. 4.

Figure 4:
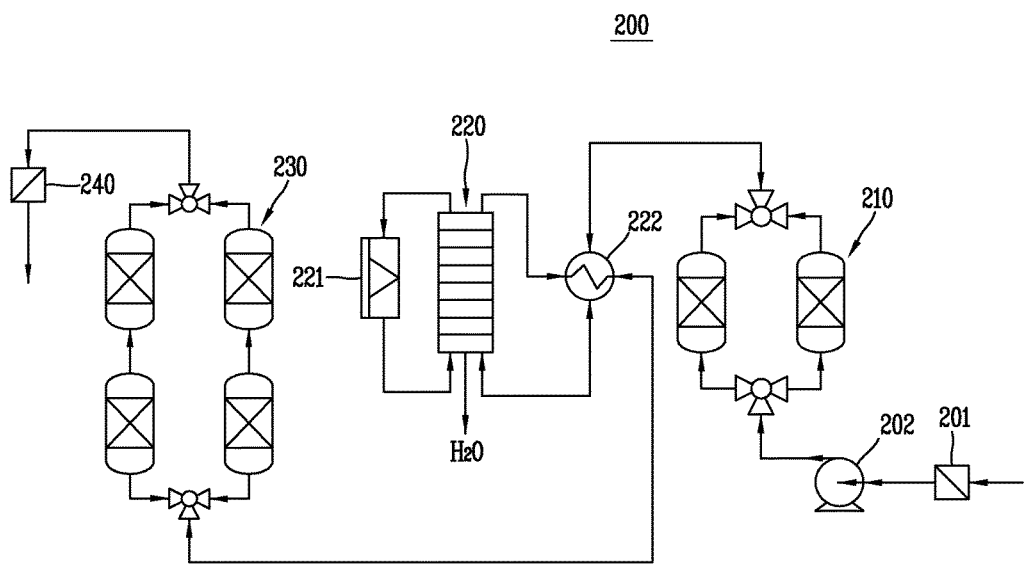
FIG. 4 is a second partial view of FIG. 1, which illustrates a pre-treatment system.

FIG. 4 is a second partial view of FIG. 1, which illustrates a pre-treatment system.

As illustrated in FIG. 4, the pre-treatment system 200 is a means for removing impurities included in the biogas stored in the biogas storing unit 460 and may include a first desulfurizer 210, a dewatering apparatus 220, and a siloxane remover 230, and furthermore, a front end of the pre-treatment system 200 may further include a first filter 201 capable of removing particulate materials and/or liquid drops included in the biogas and a compressor 202 for supplying the biogas to the pre-treatment system 200.

When each configuration is reviewed, the first desulfurizer 210 is a means for removing sulfur compounds included in the biogas, and $H_2S$, COS, organic sulfur compounds and the like may be removed by various means, but it is preferred that the sulfur compounds are removed by bringing iron oxide in direct contact with the biogas to adsorb hydrogen sulfide ($H_2S$) included in the biogas thereon. Since the hydrogen sulfide ($H_2S$) included in the biogas is odorous and hazardous and may corrode various pipes, gas meters, tanks and the like for piping, it is preferred that the sulfur compounds are removed through the first desulfurizer 210 at the front end of the pre-treatment system 200.

The dewatering apparatus 220 is a means for removing moisture included in the biogas which goes through the first desulfurizer 210, and moisture ($H_2O$) may be removed by various means, but according to an exemplary embodiment, it is preferred that moisture is removed by allowing the biogas to reach a predetermined dew point temperature using a condenser 222 and/or a chiller 221, and the like, as illustrated in FIG. 4.

The siloxane remover 230 is a means for removing siloxane included in the biogas, and siloxane may also be removed by various means, but it is preferred that siloxane is condensed and removed in a high pressure/low temperature (HPLT) condenser from the viewpoint of the efficiency of removing siloxane. That is, in the case where the high pressure/low temperature condenser is operated at a low temperature of −9° F., when a 1μ-coalescing filter is used as a second filter 240 at a rear end of the siloxane remover 230, siloxane included in the biogas may be essentially removed.

The third part is a part in which high-purity fuel is purified from the pre-treated gas, and will be described in detail with reference to FIG. 2.

Figure 2:
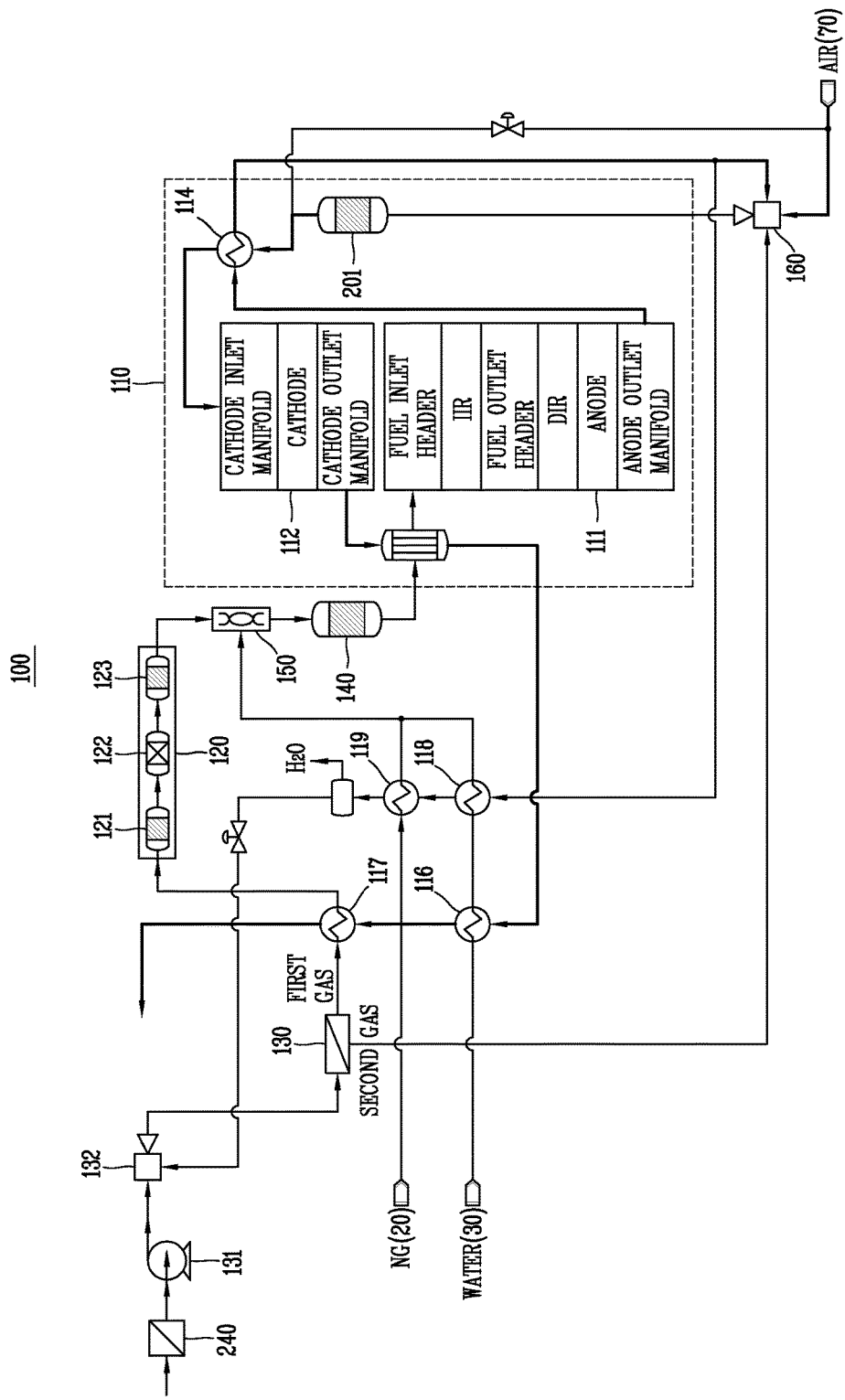
FIG. 2 is a first partial view of FIG. 1, which deals mainly with a fuel cell.

FIG. 2 is a first partial view of FIG. 1, which deals mainly with a fuel cell.

As illustrated in FIG. 2, a fuel cell generation system 100 according to the present invention includes the fuel cell 110 and a gas-purification separation unit 130.

Figure 5A:
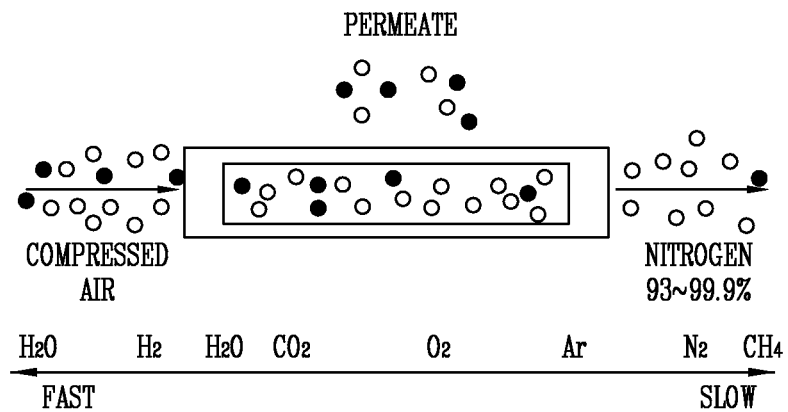
FIGS. 5A and 5B are views for describing the principle of a gas-purification separation unit according to an exemplary embodiment of the present invention.
Figure 5B:
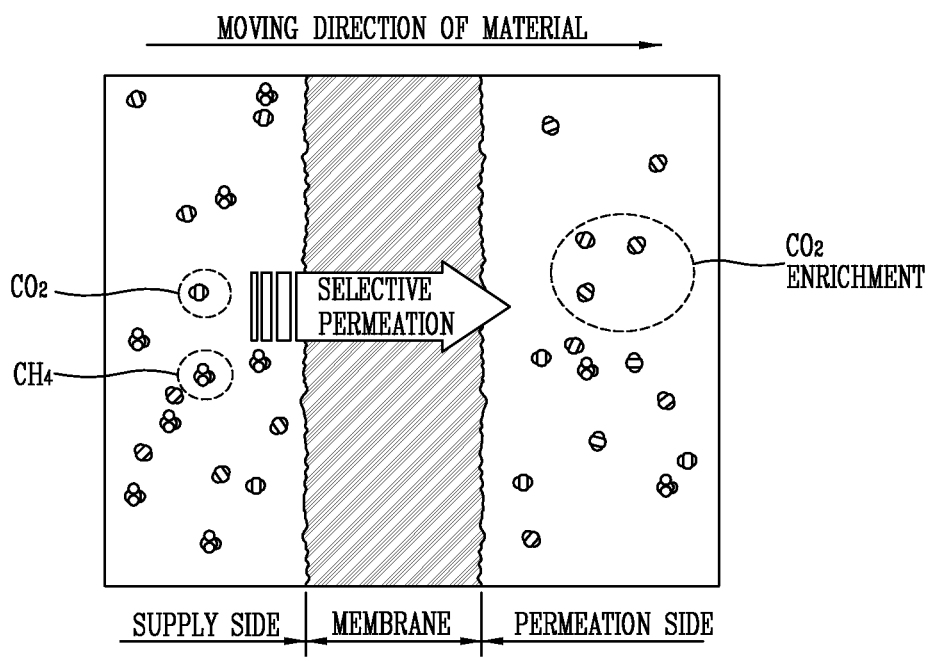

The gas-purification separation unit 130 is a means for separating a first gas required at a fuel electrode of the fuel cell 110 and a second gas required at an air electrode of the fuel cell 110 from the biogas, and it is preferred that the separation is performed in accordance with a selective permeation method using a separation membrane as illustrated in FIGS. 5A and 5B.

According to an exemplary embodiment of the present invention, the first gas may be methane ($CH_4$) and the second gas may be carbon dioxide ($CO_2$), and hereinafter, this will be described, but it is not intended that the scope of the present invention is not limited thereto, and the gases may vary depending on the type of the fuel cell, and the like.

FIGS. 5A and 5B are views for describing the principle of a gas-purification separation unit according to an exemplary embodiment of the present invention, and as illustrated in FIGS. 5A and 5B, the gas-purification separation unit 130 may separate a specific gas by using differences in solubility, moving rate, and the like between gases when the gases pass through the separation membrane.

In this case, examples of the separation membrane for allowing the gas-purification separation unit 130 to selectively permeate the gas include a diffusion-permeation type by means of a porous membrane and a dissolution-diffusion type by means of a non-porous membrane. The porous membrane separates the specific gas by using a difference in rate of each gas component flowing through pores in the membrane, and the non-porous membrane separates the specific gas by allowing gas molecules to be first dissolved on the surface of the membrane at a high pressure side, and then to be diffused in the membrane toward the low pressure side and dissolved on the membrane at the low pressure surface. In the separation membrane process, additional energy for the phase change is not required so that energy to be required is low, the process operation is simple due to the compact process, and it is possible to achieve the scale-up by means of modulation.

Accordingly, for the biogas going through the gas-purification separation unit 130, it is possible to capture carbon dioxide ($CO_2$) from biogas including methane ($CH_4$), carbon dioxide ($CO_2$), and the like by using physical and chemical properties of a porous separation membrane, and it is also possible to collect high-purity methane ($CH_4$) from the biogas by capturing carbon dioxide ($CO_2$). For separation of methane ($CH_4$) and carbon dioxide ($CO_2$), since carbon dioxide is larger than methane ($CH_4$) from the viewpoint of molecular size and molecular weight, carbon dioxide ($CO_2$) is larger than methane ($CH_4$) even from the viewpoint of diffusivity and movement radius, carbon dioxide ($CO_2$) is larger than methane ($CH_4$) even from the viewpoint of solubility and affinity with a polar/membrane material, the permeation rate for carbon dioxide ($CO_2$) is greater than that for methane ($CH_4$). Therefore, methane ($CH_4$) and carbon dioxide ($CO_2$) may be separated by a selective permeation method using the separation membrane as described above.

The first gas and the second gas, which thus separated from the biogas by the gas-purification unit 130, are supplied to a fuel electrode 111 and an air electrode 112, respectively to operate the fuel cell 110.

In this case, according to an exemplary embodiment of the present invention, the fuel cell 110 recycles gas discharged from the fuel electrode 111 to supply the gas to the gas-purification separation unit 130, the gas-purification separation unit 130 again supplies the second gas produced by performing separation and purification using exhaust gas including carbon dioxide ($CO_2$) at the fuel electrode 111 along with the biogas to the air electrode 112 to again recycle gas discharged from the fuel cell 110 without being discarded at the fuel cell 110, and it is possible to bring about an effect of increasing the voltage of the cell due to an increase in partial pressure of carbon dioxide by using high-purity carbon dioxide ($CO_2$).

When the configuration is more specifically reviewed, a by-product gas discharged from the fuel electrode 111 is a gas including unreacted hydrogen ($H_2$), carbon monoxide (CO), and carbon dioxide ($CO_2$), and the like, and may go through a first heat exchanger 114 to be supplied to a second mixing unit 160, and the second mixing unit 160 may mix air 10 externally supplied and/or the second gas separated from the gas-purification separation unit 130 to allow the mixed gas to be supplied to the air electrode 112.

Herein, the gas mixed by the second mixing unit 160 may be allowed to selectively go through an oxidation unit 113 which is a means for combusting air 10 in order to supply carbon dioxide ($CO_2$) to the air electrode 112.

For a first mixing unit 132 and the second mixing unit 160 to be described below, which mix the by-product gas discharged from the fuel electrode, a venture type mixer shown in U.S. Pat. No. 6,902,840 may be used as an example, but is not particularly limited, and a specific description thereof will be omitted.

Meanwhile, the by-product gas discharged from the fuel electrode 111 may go through a fifth heat exchanger 118 and a sixth heat exchanger 119 in addition to the route as descried above to be mixed with the biogas subjected to the pre-treatment process by the pre-treatment system 200, and the resulting mixture may be supplied to the gas-purification separation unit 130. In this manner, the fuel cell 110 recycles gas discharged from the fuel electrode 111 to supply the gas to the gas-purification separation unit 130, the gas-purification separation unit 130 separates and purifies the second gas by using exhaust gas including carbon dioxide ($CO_2$) at the fuel electrode 111 and again supplies the second gas to the air electrode 112 to again recycle gas discharged from the fuel cell 110 without being discarded at the fuel cell 110, and it is possible to bring about an effect of increasing the voltage of the cell due to an increase in partial pressure of carbon dioxide by using high-purity carbon dioxide ($CO_2$).

In this case, as illustrated in FIG. 2, a front end of the first mixing unit may further include a compressor 131 such that the biogas going through the pre-treatment system 200 may be smoothly supplied to the fuel cell generation system 100.

Second Exemplary Embodiment

As described above, the first gas may be supplied to the fuel electrode 111, but according to an exemplary embodiment of the present invention, it is preferred that the purity of methane ($CH_4$) included in the first gas is increased through a polisher 120 without directly supplying the first gas to the fuel electrode 111.

Figure 3:
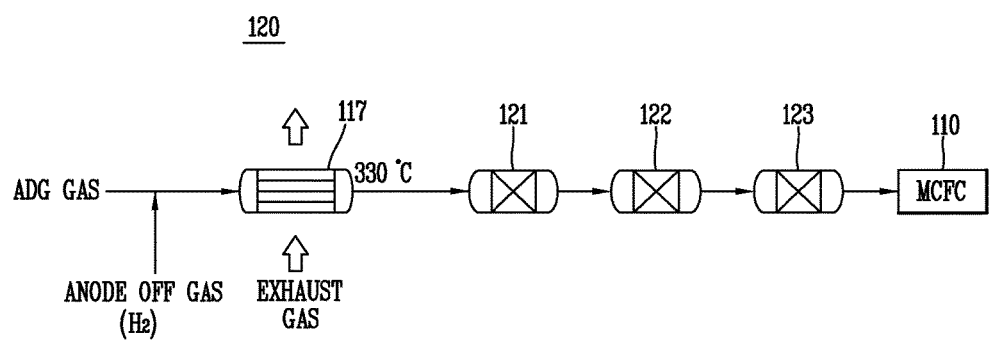
FIG. 3 is a partial view of FIG. 2, which illustrates a configuration of a polisher.

The polisher 120 may include an apparatus 121 for performing hydrogenation, a second desulfurizer 122, and a dechlorinator 123, as illustrated in FIG. 3.

The apparatus 121 for performing hydrogenation uses gas including hydrogen ($H_2$) discharged from the fuel electrode 111 of the fuel cell to subject the gas to hydrogenation reaction with the biogas or the first gas separated by the gas-purification separation unit 130.

As an example, the apparatus 121 for performing hydrogenation causes hydrogenation reactions as in the following Reaction Formulae 1 to 5 to occur.

$$C_2H_3Cl+H_2 \rightarrow C_2H_4HCl \qquad \text{[Reaction Formula 1]}$$

$$C_6H_4Cl_2+2H_2 \rightarrow C_6H_6+2HCl[ \qquad \text{Reaction Formula 2]}$$

$$CCl_3F+4H_2 \rightarrow CH_4+H_2S \qquad \text{[Reaction Formula 3]}$$

$$C_2H_6S+H_2 \rightarrow C_2H_6+H_2S \qquad \text{[Reaction Formula 4]}$$

$$COS+4H_2 \rightarrow CH_4+H_2O+H_2S \qquad \text{[Reaction Formula 5]}$$

The apparatus 121 for performing hydrogenation may produce chlorine compounds and/or sulfur compounds by the hydrogenation reactions as described above, and the chlorine compounds and/or sulfur compounds thus produced may be removed by using the second desulfurizer 122 and the dechlorinator 123, thereby increasing the purity of methane ($CH_4$) included in the first gas. In this case, it is preferred that the apparatus 121 for performing hydrogenation uses a Co—Mo/alumina or Ni—Mo/alumina catalyst when the biogas or the first gas is subjected to hydrogenation reaction.

As described above, the chlorine compounds and/or sulfur compounds produced by the apparatus 121 for performing hydrogenation may be removed by using the second desulfurizer 122 and/or the dechlorinator 123.

The second desulfurizer 122 is a means for removing $H_2S$ produced by the apparatus 121 for performing hydrogenation, and metal oxide (MO), which is a metal oxide such as ZnO and $Al_2O_3$ may be used as a desulfurizing agent. The reason that the second desulfurizer 122 removes $H_2S$ by a high temperature dry desulfurization method is because it is possible to reduce the loss of sensible heat generated to decrease the temperature and again increase the temperature. That is, the reason is because the power generation heat efficiency may be enhanced when the fuel is desulfurized at a high temperature and supplied to the fuel cell 110. Furthermore, it is also possible to reduce incidental expenses caused by wastewater treatment occurring according to the wet desulfurization method.

Accordingly, in the case of the polisher 120 according to the high temperature dry desulfurization method, it is preferred that a front end thereof further includes a fourth heat exchanger 117 to warm the biogas or the first gas through gas at a high temperature, which is discharged from the fuel cell 110.

The dechlorinator 123 is a means for removing HCl produced by the apparatus 121 for performing hydrogenation, and carbonate such as $K_2CO_3$ may be used as a dechlorinating agent.

An example of the reaction occurring in the second desulfurizer 122 and the dechlorinator 123 may be represented by the following Reaction Formulae 6 and 7.

$$ZnO+H_2S \leftrightarrow ZnS+H_2O \qquad \text{[Reaction Formula 6]}$$

$$2HCl+K_2CO_3 \leftrightarrow 2KCl+CO_2+H_2O \qquad \text{[Reaction Formula 7]}$$

As described above, the polisher 120 may use gas including hydrogen ($H_2$) discharged from the fuel electrode 111 of the fuel cell to subject the gas to hydrodesulfurization and/or hydrodechlorination reaction with the biogas or the first gas separated by the gas-purification separation unit 130, and according to another exemplary embodiment of the present invention, unreacted hydrogen gas may be re-supplied to the fuel electrode 111. In this manner, the use efficiency of hydrogen gas may be enhanced by re-supplying unreacted hydrogen gas to the fuel cell 110.

Meanwhile, the fuel cell generation system 100 may mix the first gas separated through the gas-purification separation unit 130 or the first gas going through the polisher 120 with natural gas 20 through a third mixing unit 150 to supply the mixed gas to the fuel cell 110. In this case, it is preferred that the natural gas 20 is also heated in order to enhance the generation heat efficiency of the fuel cell 110, and heat may be exchanged with exhaust gas at a high temperature, which is discharged from the fuel electrode 111 of the fuel cell 110 through the sixth heat exchanger 119. In this manner, generation capacity of the fuel cell 110 may be increased by using biogas as a fuel of the fuel cell 110, and co-firing the natural gas 20.

Furthermore, it is more preferred that the natural gas 20 to be mixed with the first gas is also allowed to pass through a third desulfurizer 21 in order to remove sulfur compounds (see FIG. 4). As an exemplary embodiment, a desulfurization effect may be obtained by charging the third desulfurizer 21 with activated carbon, Zeolite, and a mineral-based adsorbent, and allowing the natural gas 20 to go through the charged adsorbent.

Furthermore, as described above, the third mixing unit 150 may be supplied with external water ($H_2O$) 30 to adjust the ratio of steam/carbon in addition to mixing the natural gas 20 with the first gas. The third mixing unit 150 may be supplied with external water ($H_2O$) 30 through a means such as a typical pump 31 (see FIG. 4) so that the ratio of steam to carbon included in the natural gas and/or the first gas may be adjusted by a controlling unit (not illustrated) so as to coincide with a predetermined ratio.

In this case, the ratio of steam/carbon may be calculated by various methods, and the flow rate of carbon may be calculated by multiplying the flow rate of the natural gas and/or the first gas by the ratio of carbon in the natural gas and/or the first gas.

The third mixing unit 150 may also be directly supplied with moisture in a steam state in order to adjust the ratio of steam/carbon, and it is possible to use exhaust gas at a high temperature, which is discharged from the fuel cell 110 in order to vaporize water 30 externally supplied. Specifically, as illustrated in FIG. 2, exhaust gas at a high temperature, which is discharged from the fuel electrode 111 and/or the air electrode 112 of the fuel cell 110 may heat water 30 externally supplied through the third heat exchanger 116 and/or the fifth heat exchanger 118, respectively.

In particular, the exhaust gas at a high temperature, which is discharged from the air electrode 112, may heat fuel to be supplied to the fuel electrode 111 through the second heat exchanger 115, and may be recycled without discarding the remaining gas portions to heat water 30 externally supplied through the third heat exchanger 116, or heat the first gas through the fourth heat exchanger 117, as illustrated in FIGS. 2 and 4.

Meanwhile, a pre-reforming unit 140 may be further included according to the type of the fuel cell before the first gas or the first gas co-fired with the natural gas 20 is supplied to the fuel cell 110.

The pre-reforming unit 140 is a means for converting higher hydrocarbons included in the natural gas, that is, alkanes having 2 to 100 carbon atoms into methane ($CH_4$), hydrogen ($H_2$), and the like, and usually serves to increase the concentration of hydrogen and decrease the concentration of carbon monoxide. A pre-reforming occurring in the pre-reforming unit may be represented by the following Reaction Formulae 8 to 10, the reaction represented by Reaction Formula 8 is an endothermic reaction, and the reactions represented by Reaction Formulae 9 and 10 are exothermic reactions.

$$C_nH_m + nH_2O \rightarrow nCO + (n+\tfrac{1}{2}m)H_2 \quad \text{[Reaction Formula 8]}$$

$$CO + 3H_2 \rightarrow CH_4 + H_2O \quad \text{[Reaction Formula 9]}$$

$$CO + H_2O \rightarrow CO_2 + H_2 \quad \text{[Reaction Formula 10]}$$

When the fuel cell 110 is an internal reforming type as in the MCFC, the pre-reforming unit 140 may be disposed at a front end of the fuel cell 110, into which fuel is injected to reduce burden on the main reformer and prevent the main reforming catalyst from being inactivated, thereby increasing the energy efficiency, and an in-stack heat balance may be maintained because the pre-reforming unit 140 is operated at a temperature relatively lower than the operation temperature of the fuel cell stack. In this case, as a reforming catalyst of the pre-reforming unit 140, nickel (Ni), ruthenium (Ru) or rhodium (Rh)-based catalyst and the like may be used, but it is preferred that a nickel-based catalyst having a high activity is used.

Third Exemplary Embodiment

According to an exemplary embodiment of the present invention, gas at a high temperature, which is discharged from the fuel cell 110, may be provided when sludge is dried and/or sludge is digested.

As illustrated in FIG. 2, as an example, gas at a high temperature, which is discharged from the air electrode 112 of the fuel cell 110 may heat water 30 externally supplied and/or gas separated through the gas-purification separation unit 130, and it is preferred that the combination is used or a heat collecting unit 310 apart from the combination is used to supply heat energy to an anaerobic digesting unit 430 and/or a sludge dryer 320.

When the solid materials sorted through a screen 410 from organic waste such as fishery product processed residue, food waste, sewage sludge, toilet septic tank excrement, and livestock manure are dried through the sludge dryer 320 in order to become a resource such as carbide or compost, surplus heat from the fuel cell 110 may be additionally utilized by drying the solid materials utilizing exhaust gas at a high temperature, which is discharged from the fuel cell 110, and even when the digestion temperature of the anaerobic digesting unit 430 in which the sludge is digested is maintained, surplus heat of the fuel cell 110 may be additionally utilized likewise.

Generation Method

Figure 6:
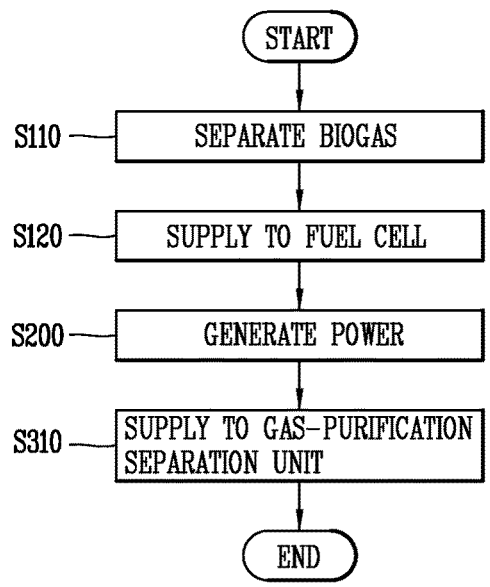
FIGS. 6 and 7 are flowcharts illustrating step-by-step generation methods using a fuel cell according to an exemplary embodiment of the present invention.
Figure 7:
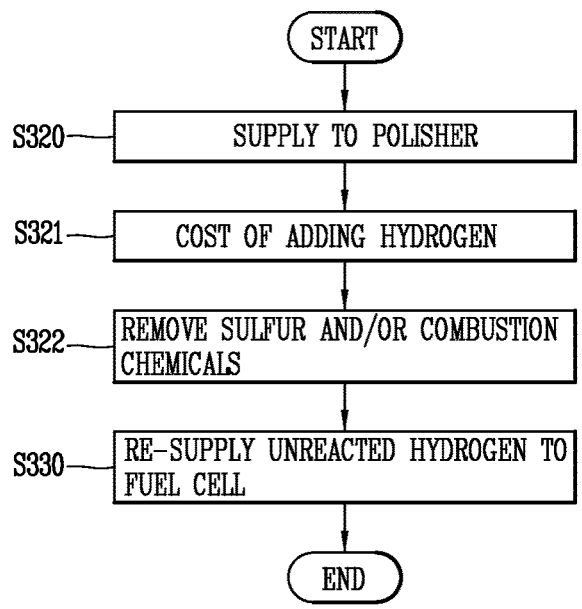

FIGS. 6 and 7 are flowcharts illustrating step-by-step generation methods using a fuel cell according to an exemplary embodiment of the present invention.

A generation method using the fuel cell according to an exemplary embodiment of the present invention include separating biogas into a first gas and a second gas by a gas-purification separation unit (S110), supplying the first gas and the second gas to a fuel cell (S120), generating power by the fuel cell using the first gas and the second gas (S200), and supplying gas discharged from the fuel cell to the gas-purification separation unit (S310).

Hereinafter, each configuration will be reviewed in detail with reference to FIGS. 1 to 4, portions which are repeated in terms of the description will be substituted with those described in the previous description, and the detailed description thereof will be omitted.

The gas-purification separation unit 130 separates biogas into a first gas required at a fuel electrode of the fuel cell 110 and a second gas required at an air electrode of the fuel cell 110 (S110). According to an exemplary embodiment, the first gas may be methane ($CH_4$) and the second gas may be carbon dioxide ($CO_2$). In this case, the gas-purification 130 may separate the biogas into the first gas and the second gas by using differences in solubility, moving rate, and the like between gases.

The first gas thus separated is supplied to the fuel electrode 111 of the fuel cell 110, and the second gas is supplied to the air electrode 112 of the fuel cell 110 to operate the fuel cell 110, thereby generating power (S200). In this case, the first gas supplied to the fuel electrode 111 of the fuel cell 110 may be co-fired with natural gas 20 and supplied.

The exhaust gas, which is discharged from the fuel electrode 111 among the exhaust gases which are discharged from the fuel cell 100, is recycled to supply the gas to the gas-purification separation unit 130, and the gas-purification 130 allows the second gas produced by separating and purifying carbon dioxide ($CO_2$) included in the exhaust gas of the fuel electrode 111 to be again supplied to the air electrode 112 to recycle the exhaust gas of the fuel cell 110, and it is possible to bring about an effect of increasing the voltage of the cell due to an increase in partial pressure of carbon dioxide of the fuel cell 110 to which high-purity carbon dioxide is supplied.

Meanwhile, according to still another exemplary embodiment of the present invention, the generation method using a fuel cell may further include using the first gas and the second gas purified and separated from the biogas by the gas-purification separation unit to supply the exhaust gas of the fuel electrode 111 to the polisher (S320) after the fuel cell is operated (S200), using hydrogen gas by the polisher to subject the hydrogen gas to hydrogenation reaction with the biogas (S321), and removing sulfur and/or chlorine compounds (S322), as illustrated in FIG. 7.

As illustrated in FIG. 3, the polisher 120 may include an apparatus 121 for performing hydrogenation, a second desulfurizer 122, and a dechlorinator 123 to cause the hydrodesulfurization and/or hydrodechlorination reaction to occur, thereby increasing the purity of methane ($CH_4$) included in the first gas.

In this case, it is preferred that the use efficiency of hydrogen gas of the fuel cell 110 is enhanced by supplying exhaust gas discharged from the fuel electrode 111 of the fuel cell 110 to the polisher 120 and using hydrogen ($H_2$) included in the exhaust gas of the fuel electrode 111 by the polisher 120 to cause a hydrogenation reaction with the biogas or the first gas to occur.

Further, according to an exemplary embodiment, the polisher 120 may further include re-supplying unreacted hydrogen gas to the fuel electrode (S330).

The polisher 120 causes the hydrodesulfurization and/or hydrodechlorination reaction to occur, and may again re-supply unreacted surplus hydrogen to the fuel electrode 111 of the fuel cell, thereby enhancing the use efficiency of the gas used in the fuel cell.

Meanwhile, according to yet another embodiment of the present invention, the generation method using a fuel cell may further include providing exhaust gas at a high temperature, which is discharged from the fuel cell when sludge is dried and/or digested (S330).

The fuel cell 100 operated at a high temperature discharges exhaust gas at a high temperature. In this case, in order for the fuel cell 110 to utilize exhaust gas at a high temperature, which is discharged, exhaust gas of the fuel electrode and/or exhaust gas of the air electrode may be used to heat the first gas, the natural gas, and/or water, and the like as illustrated in FIG. 1, thereby preventing surplus heat of the fuel cell from being lost.

However, apart from this, in the case of a fuel cell using biogas as a fuel, it is preferred that heat energy included in the exhaust gas is provided to the sludge dryer 320 or the anaerobic digesting unit 430. That is, when the solid materials sorted from organic waste are dried through the sludge dryer 320 in order to become a resource such as carbide or compost, or the digestion temperature of the anaerobic digesting unit 430 in which sludge is digested is maintained, surplus heat of the fuel cell 110 may be provided to heat energy required to prevent surplus heat of the fuel cell 110 to be discarded from being lost.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A fuel cell using biogas as a fuel,
wherein the fuel cell is supplied with a first gas required at a fuel electrode and a second gas required at an air electrode, wherein the biogas is separated into the first gas and the second gas by a gas-purification separation unit, and wherein the fuel cell supplies gas discharged from the fuel cell along with the biogas to the gas-purification separation unit.

2. The fuel cell of claim 1, wherein the biogas is separated into the first gas and the second gas by means of a selective permeation method using a separation membrane by the gas-purification separation unit.

3. The fuel cell of claim 1, wherein the first gas comprises methane and the second gas comprises carbon dioxide.

4. The fuel cell of claim 1, wherein the fuel cell supplies gas discharged from the air electrode to a polisher such that the gas is subjected to hydrogenation reaction with the biogas in order to increase a purity of methane in the biogas.

5. The fuel cell of claim 4, wherein the fuel cell is re-supplied with unreacted hydrogen gas from the polisher.

6. The fuel cell of claim 1, wherein when the biogas is an anaerobic digestion gas, the fuel cell provides gas at a high temperature, which is discharged from the fuel cell when sludge is dried and/or digested.

7. A fuel cell using biogas as a fuel,
wherein a hydrogenation reaction with the biogas is used to supply gas discharged from the fuel cell to a polisher which increases a purity of methane in the biogas.

8. The fuel cell of claim 7, wherein the fuel cell is re-supplied with gas which is supplied to the polisher and is not reacted after a desulfurization reaction.

9. The fuel cell of claim 7, wherein when the biogas is an anaerobic digestion gas, the fuel cell provides gas at a high temperature, which is discharged from the fuel cell when sludge is dried and/or digested.

10. A generation system which uses a fuel cell, comprising:
a fuel cell using biogas as a fuel; and
a gas-purification separation unit which separates the biogas into a first gas required at a fuel electrode of the fuel cell and a second gas required at an air electrode of the fuel cell, wherein the fuel cell supplies gas exhausted along with the biogas to the gas-purification separation unit.

11. The generation system of claim 10, wherein the gas-purification separation unit separates the biogas into the first gas and the second gas by a selective permeation method using a separation membrane.

12. The generation system of claim 10, wherein the gas-purification separation unit separates gas externally supplied into a first gas comprising methane and a second gas comprising carbon dioxide.

13. The generation system of claim 10, further comprising:
   a pre-reforming unit which converts hydrocarbon into hydrogen at a front end of the fuel cell; and
   a mixing unit which mixes the first gas with natural gas at a front end of the pre-reforming unit to supply the mixture to the pre-reforming unit.

14. The generation system of claim 10, further comprising:
   a polisher which subjects gas discharged from an air electrode of the fuel cell to hydrogenation reaction with the biogas to increase a purity of methane in the first gas.

15. The generation system of claim 14, wherein the polisher removes sulfur compounds and/or chlorine compounds from a gas in which the hydrogenation reaction is performed.

16. The generation system of claim 14, wherein the polisher re-supplies unreacted hydrogen gas to the fuel electrode.

* * * * *